(12) United States Patent
Kojima

(10) Patent No.: US 7,600,802 B2
(45) Date of Patent: Oct. 13, 2009

(54) SEAT APPARATUS FOR VEHICLE

(75) Inventor: Yasuhiro Kojima, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 445 days.

(21) Appl. No.: 11/384,517

(22) Filed: Mar. 21, 2006

(65) Prior Publication Data

US 2006/0214460 A1 Sep. 28, 2006

(30) Foreign Application Priority Data

Mar. 24, 2005 (JP) .............................. 2005-086903

(51) Int. Cl.
*B60N 2/08* (2006.01)
(52) U.S. Cl. ............... 296/65.13; 296/65.14; 297/344.1
(58) Field of Classification Search ............. 296/65.01, 296/65.13, 65.14; 297/344.1, 344.13; 248/429, 248/430
See application file for complete search history.

(56) References Cited

U.S. PATENT DOCUMENTS

| | | | | |
|---|---|---|---|---|
| 4,881,774 | A * | 11/1989 | Bradley et al. | 297/341 |
| 5,605,377 | A * | 2/1997 | Tame | 297/341 |
| 5,944,383 | A * | 8/1999 | Mathey et al. | 297/341 |
| 6,048,030 | A * | 4/2000 | Kanda et al. | 297/341 |
| 6,098,946 | A * | 8/2000 | Sechet et al. | 248/424 |
| 6,227,596 | B1 * | 5/2001 | Foucault et al. | 296/65.13 |
| 6,341,819 | B1 * | 1/2002 | Kojima et al. | 297/341 |
| 6,460,929 | B2 * | 10/2002 | Kamida | 297/344.1 |
| 6,474,739 | B1 * | 11/2002 | Lagerweij | 297/341 |
| 6,631,879 | B2 * | 10/2003 | Hibino et al. | 248/429 |
| 6,641,104 | B2 * | 11/2003 | Flick | 248/430 |
| 7,066,521 | B2 * | 6/2006 | Jung et al. | 296/65.13 |
| 7,318,573 | B2 * | 1/2008 | Yamada et al. | 248/424 |

(Continued)

FOREIGN PATENT DOCUMENTS

EP 0 683 066 A1 11/1995

(Continued)

OTHER PUBLICATIONS

State Intellectual Property Office of P.R.C., Notification of First Office Action, Issued, Nov. 7, 2008 (5 pages).

(Continued)

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP

(57) ABSTRACT

A seat apparatus for a vehicle includes a first rail secured to a floor of the vehicle, a second rail relatively movable to the first rail, a lock member for restricting a movement of the second rail relatively to the first rail, an operational member for engaging with the lock member, a memory release member operable with the operational member, a release member for engaging with the lock member, and a memory member of which a movement relative to the floor of the vehicle can be restricted. When a restriction of the movement of the second rail is released by the operational member, the memory release member releases a restriction of the movement of the memory member. When the restriction of the movement of the second rail is released by the release member, the movement of the memory member is restricted.

13 Claims, 9 Drawing Sheets

U.S. PATENT DOCUMENTS

| | | | |
|---|---|---|---|
| 7,328,877 B2 * | 2/2008 | Yamada et al. | 248/430 |
| 2004/0262969 A1 | 12/2004 | Sasaki et al. | |
| 2005/0184550 A1 * | 8/2005 | Jung et al. | 296/65.13 |
| 2006/0214460 A1 * | 9/2006 | Kojima | 296/65.13 |
| 2008/0084085 A1 * | 4/2008 | Mizuno et al. | 296/65.13 |
| 2008/0238127 A1 * | 10/2008 | Kojima et al. | 296/65.13 |

FOREIGN PATENT DOCUMENTS

JP  6-86194  11/1994

OTHER PUBLICATIONS

European Patent Office, Extended European Search Report, Dec. 3, 2008 (8 pages).

* cited by examiner

SEAT APPARATUS FOR VEHICLE

CROSS REFERENCE TO RELATED APPLICATIONS

This application is based on and claims priority under 35 U.S.C. § 119 to Japanese Patent Application 2005-086903, filed on Mar. 24, 2005, the entire content of which is incorporated herein by reference.

FIELD OF THE INVENTION

This invention generally relates to a seat apparatus. More specifically, this invention pertains to a seat apparatus for a vehicle.

BACKGROUND

A conventional seat apparatus for a vehicle such as an automotive is, for example, described in JPH6-86194A (document 1). The seat apparatus for a vehicle includes a lower rail (3) secured to a floor of the vehicle and an upper rail (4) secured to a seat. The upper rail is relatively movably supported to the lower rail. In the seat apparatus for a vehicle, the upper rail is moved relatively to the lower rail, whereby the seat position can be adjusted.

The seat apparatus for a vehicle further includes a lock member (7) for restricting a movement of the upper rail relative to the lower rail. The restriction of the movement of the upper rail relative to the lower rail by the lock member can be released when a slide lock release lever (8) is operated by a user.

The seat apparatus for a vehicle further includes a memory member (10). When the slide lock release lever is operated by a user to a first stage, the upper rail (seat) is permitted to move backward while the memory member retains a seat position where the seat was placed before the slide lock lever is operated. After that, when the upper rail is moved forward, the movement of the upper rail is restricted at the seat position memorized by the memory member. On the other hand, when the slide lock release lever is operated by a user to a second stage, the seat position memorized by the memory member can be changed in accordance with a change (adjustment) of the seat position.

In the seat apparatus for a vehicle, an action of the memory member for memorizing the seat position or for changing a memorized seat position needs to be selectively switched according to a stage number (the amount of operation) when the upper rail is moved relatively to the lower rail, in other words, the seat position is adjusted. Accordingly, a user is required to separately utilize stages of the slide lock release lever to adjust a seat position. In other words, the seat apparatus for a vehicle forces a user to understand a configuration thereof. If a user does not understand the configuration sufficiently, there can be a danger that the user induces an unintended action of the seat apparatus.

A need thus exists for a seat apparatus for a vehicle, in which operations can be separately utilized in a clear manner for memorizing a seat position or for changing a memorized seat position. The present invention has been made in view of the above circumstances and provides such a seat apparatus for a vehicle.

SUMMARY OF THE INVENTION

According to an aspect of the present invention, a seat apparatus for a vehicle includes a first rail secured to a floor of the vehicle, a second rail secured to a seat and relatively movable to the first rail, a lock member for restricting a movement of the second rail relative to the first rail, an operational member for engaging with the lock member to release a restriction of the movement of the second rail relative to the first rail exerted by the lock member, a memory release member operable with the operational member, a release member operable in association with a tilt of a seat back over a predetermined angle for engaging with the lock member to release the restriction of the movement of the second rail relative to the first rail exerted by the lock member, and a memory member of which a movement relative to the floor of the vehicle is restricted when the movement of the second rail relative to the first rail is restricted by the lock member. When the restriction of the movement of the second rail relative to the first rail is released by the operational member, the memory release member engages with the memory member so that a restriction of the movement of the memory member relative to the floor of the vehicle is released and so that the memory member integrally moves with the second rail. On the other hand, when the restriction of the movement of the second rail relative to the first rail is released by the release member, the movement of the memory member relative to the floor of the vehicle is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

According to a further aspect of the present invention, a seat apparatus for a vehicle includes a first rail secured to a floor of the vehicle, a second rail secured to a seat and relatively movable to the first rail, a lock member for restricting a movement of the second rail relative to the first rail, an operational member for engaging with the lock member to release a restriction of the movement of the second rail relative to the first rail exerted by the lock member, a memory release member operable with the operational member, a release member operable in association with a tilt of a seat back over a predetermined angle for engaging with the lock member to release the restriction of the movement of the second rail relative to the first rail exerted by the lock member, a memory rail secured to the floor of the vehicle, and a memory member of which a movement relative to the memory rail is restricted when the movement of the second rail relative to the first rail is restricted by the lock member. When the restriction of the movement of the second rail relative to the first rail is released by the operational member, the memory release member engages with the memory member so that a restriction of the movement of the memory member relative to the memory rail is released and so that the memory member integrally moves with the second rail. On the other hand, when the restriction of the movement of the second rail relative to the first rail is released by the release member, the movement of the memory member relative to the memory rail is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

According to a further aspect of the present invention, a seat apparatus for a vehicle includes a first rail secured to a floor of the vehicle, a second rail secured to a seat and relatively movable to the first rail, a lock member for restricting a movement of the second rail relative to the first rail, an operational member for engaging with the lock member to release a restriction of the movement of the second rail relative to the first rail exerted by the lock member, a release member for engaging with the lock member to release the restriction of the movement of the second rail relative to the first rail exerted by the lock member independently from the operational member, and a memory member for restricting the movement of the second rail to a position relative to the first rail before the second rail moves in a first direction when the second rail relatively moves to the first rail in the first direction and after that the second rail relatively moves to the first rail in a second direction.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
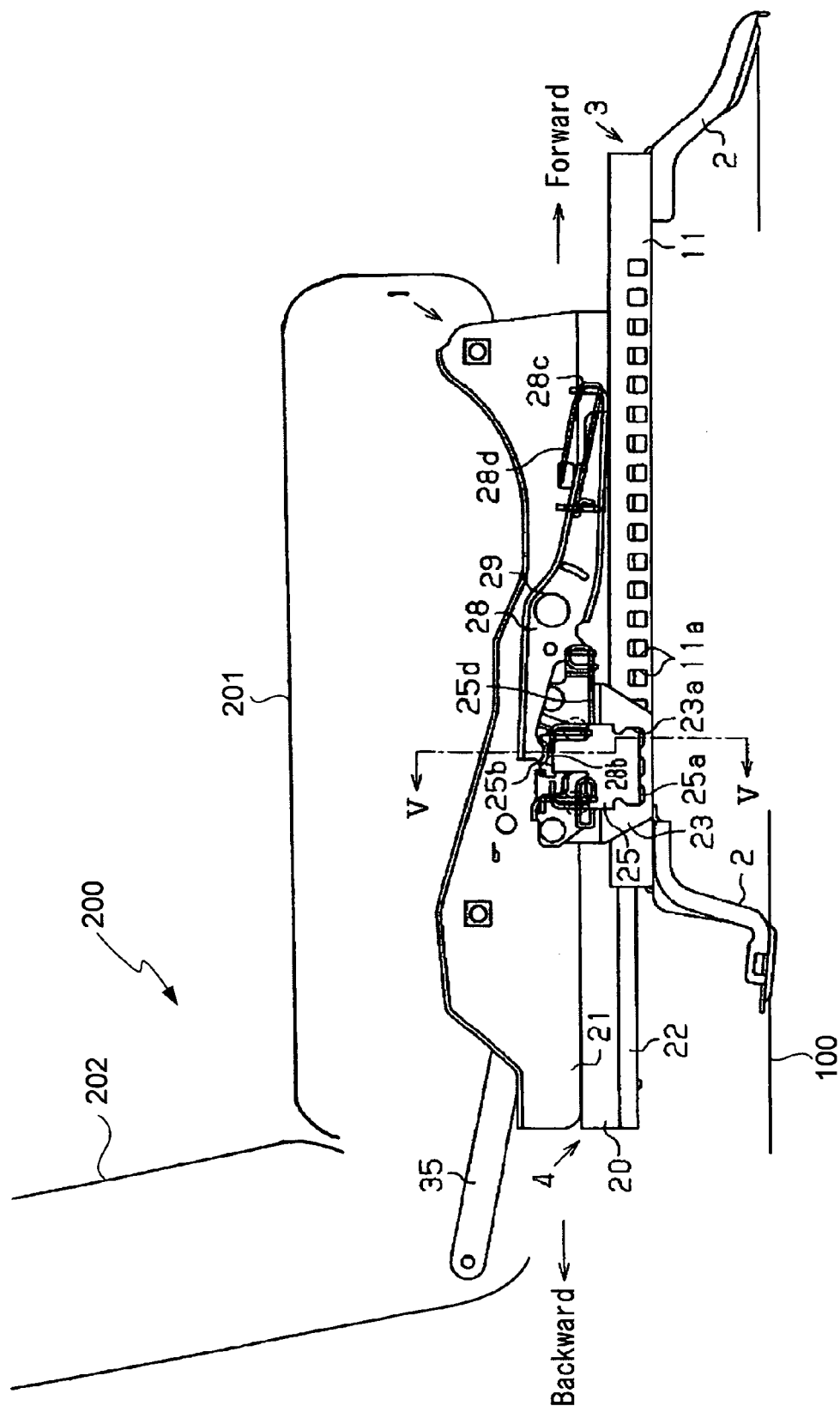
FIG. 1 represents a side view illustrating a seat apparatus for a vehicle according to an embodiment of the present invention as seen from an inner side in terms of a seat.
Figure 2:
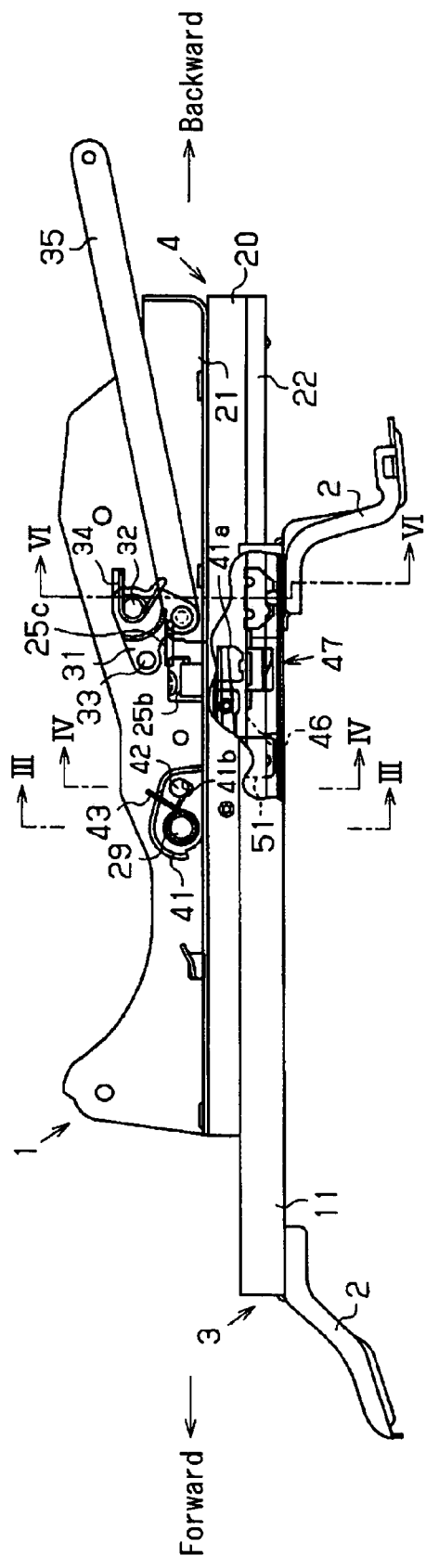
FIG. 2 represents a side view illustrating the seat apparatus according to the embodiment as seen from an outer side in terms of the seat.
Figure 3:
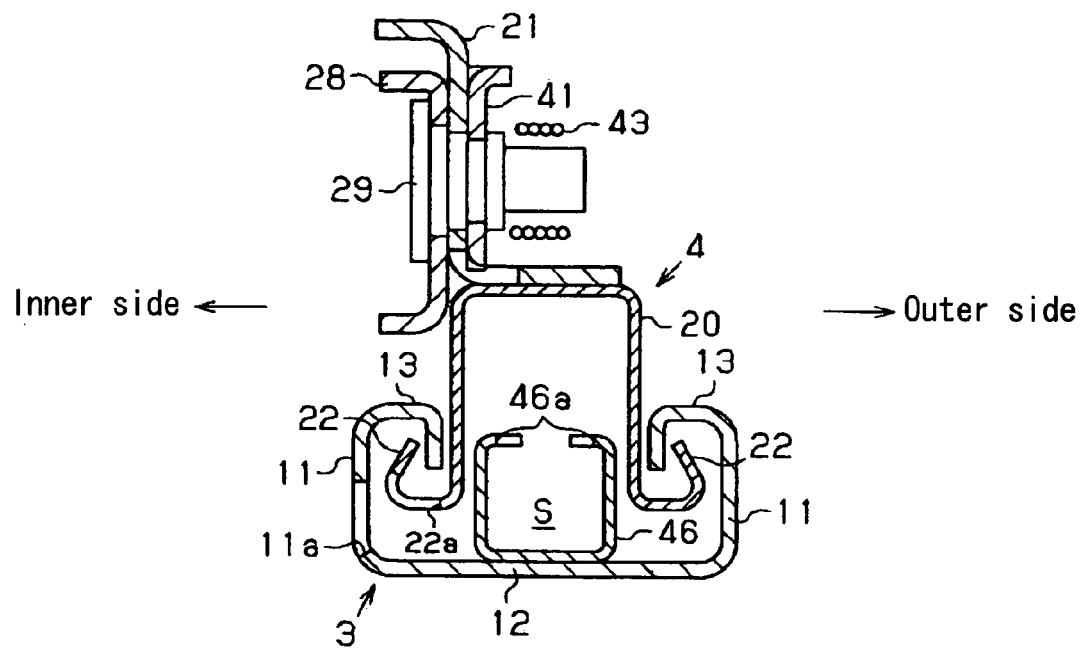
FIG. 3 represents a cross sectional view taken on line III-III of FIG. 2.
Figure 4:
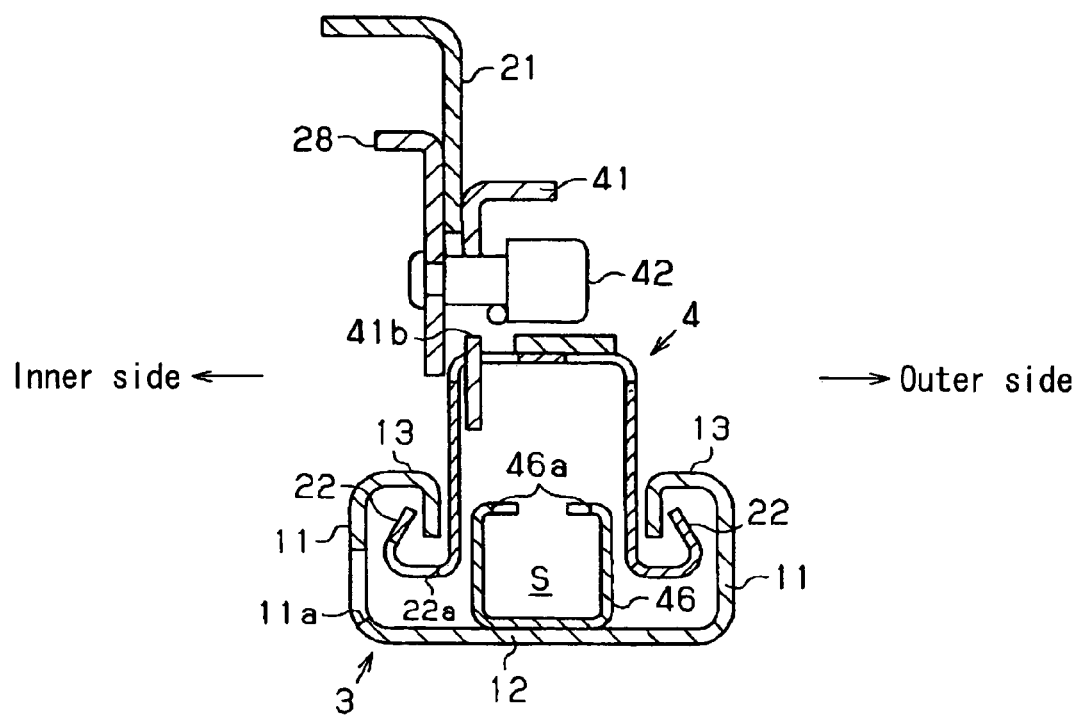
FIG. 4 represents a cross sectional view taken on line IV-IV of FIG. 2.
Figure 5:
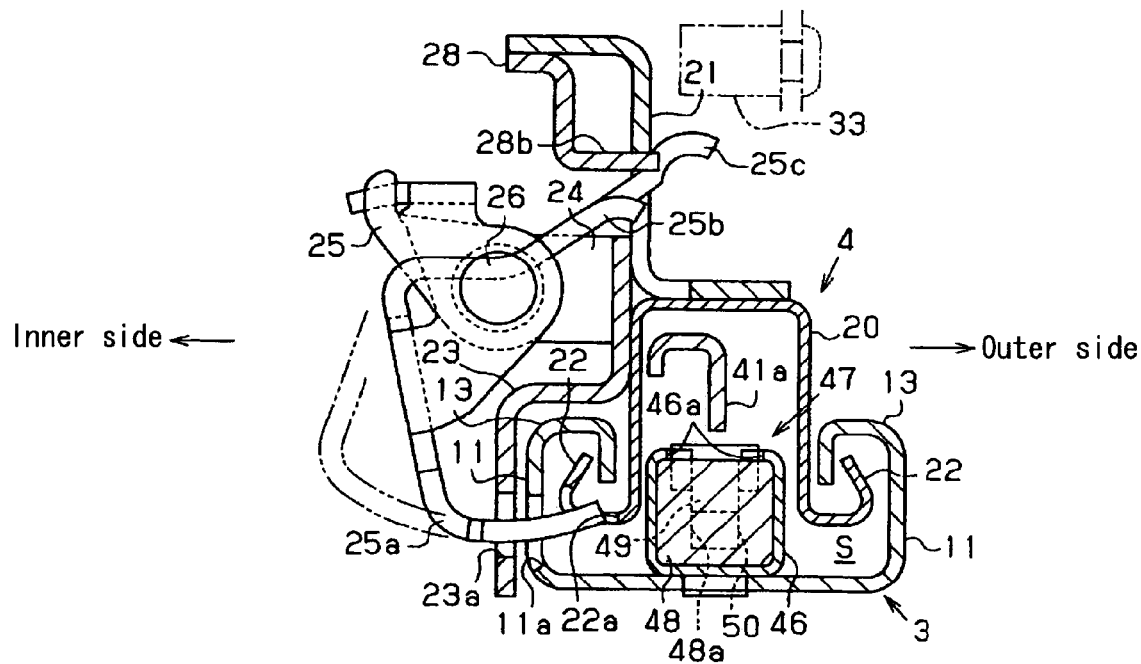
FIG. 5 represents a cross sectional view taken on line V-V of FIG. 1.
Figure 6:
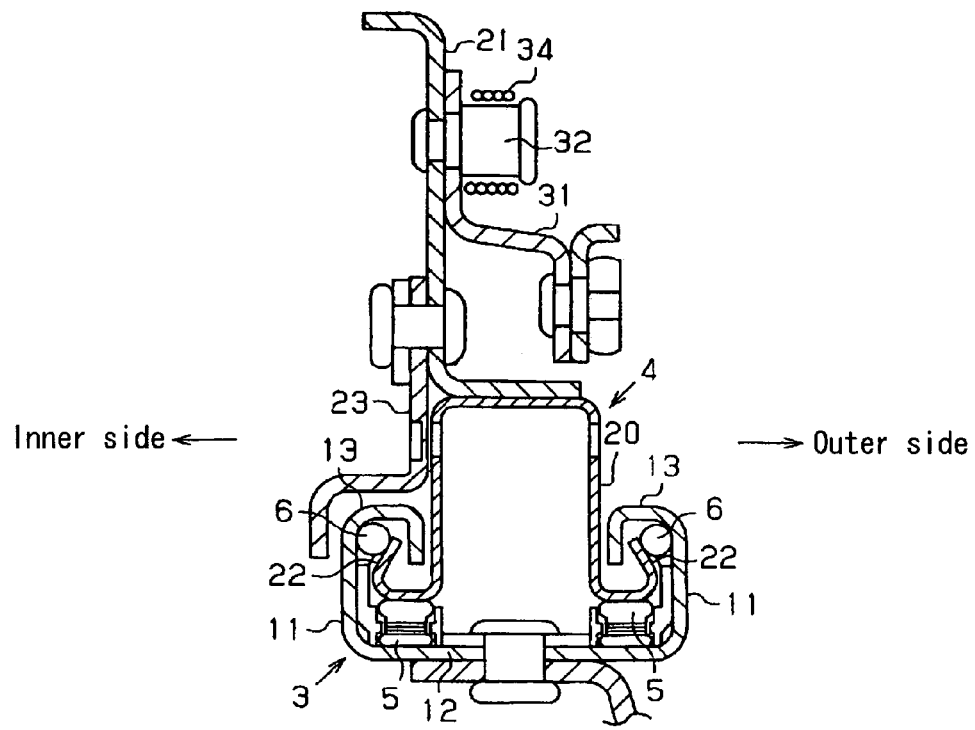
FIG. 6 represents a cross sectional view taken on line VI-VI of FIG. 2.

An embodiment of the present invention will be explained with reference to drawing figures. FIGS. 1 and 2 represent side views illustrating a skeletal portion of a seat apparatus 1 for a vehicle. The seat apparatus 1 can be installed to, for example, a front seat of the vehicle such as an automotive. Two skeletal portions are provided and arranged in a width direction of the seat apparatus 1 for the vehicle (in an orthogonal direction to a sheet surface of FIGS. 1 and 2). FIGS. 1 and 2 represent side views illustrating a skeletal portion provided at a left side (as seen from backward of the vehicle) as seen from an inner side and an outer side of a seat 200 respectively. A skeletal portion provided at a right side (as seen from backward of the vehicle) has basically the same configuration as in the skeletal portion provided at the left side. FIGS. 3, 4, and 6 represent cross sectional views taken on lines III-III, IV-IV, and VI-VI in FIG. 2 respectively. FIG. 5 represents a cross sectional view taken on line V-V in FIG. 1.

As illustrated in FIGS. 1 and 2, a lower rail 3, serving as a first rail, extends in a fore-aft direction of the vehicle. The lower rail 3 is secured to a floor 100 of the vehicle through two brackets 2. As illustrated in FIG. 3, the lower rail 3 has an approximate U-shape cross-section. The lower rail 3 includes two side wall portions 11 standing from both sides (arranged in a direction of a seat width) of the lower rail 3 and a bottom portion 12 connecting the side wall portions 11 each other. Each end (upper end) of the side wall portion 11 is continuously connected to a first bent portion 13 bent to inside the lower rail 3 to a width direction of the lower rail 3 and further bent to the bottom portion 12 side. The lower rail 3 has the approximate U-shape cross section and an accommodating space S inside the lower rail 3.

An upper rail 4, serving as a second rail, also extends in the fore-aft direction of the vehicle. The upper rail 4 is secured to a seat cushion frame (not illustrated) serving as a skeletal portion of a seat cushion 201 (seat 200). As illustrated in FIG. 3, the upper rail 4 includes a wall portion 20 having an approximate U-shape cross-section opening downward and a support wall portion 21 secured to an upper surface of the wall portion 20. The support wall portion 21 extends vertically. The wall portion 20 is provided between the first bent portions 13 of the lower rail 3. A second bent portion 22, bent to outside the upper rail 4 to a width direction of the upper rail 4 and further bent so as to be surrounded by each side wall portion 11 and the first bent portion 13, is continuously formed from each end (lower end) of the wall portion 20.

As illustrated in FIG. 6, the upper rail 4 is supported by the lower rail 3 through rollers 5 provided between the upper rail 4 and the bottom portion 12 of the lower rail 3. Each end portion of the second bent portion 22 of the upper rail 4 engages with each first bent portion 13 facing each end portion of the second bent portion 22 through balls 6. In a configuration described above, the upper rail 4 is slidably supported by the lower rail 3 in a longitudinal direction (in the fore-aft direction of the vehicle). When the upper rail 4 slides along the lower rail 3, the rollers 5 roll. In other words, the upper rail 4 can move relatively to the lower rail 3. The seat 200 secured to the upper rail 4 slides in the fore-aft direction of the vehicle along the floor 100 of the vehicle to which the lower rail 3 is secured.

As illustrated in FIGS. 1 and 5, plural lock holes 11a are provided at one of the side wall portions 11 of the lower rail 3, provided inner side (in terms of the seat 200). The lock holes 11a are arranged in a longitudinal direction of the side wall portion 11 at a predetermined interval. Plural insert holes 22a are provided at one of the second bent portion 22 of the upper rail 4, provided inner side (in terms of the seat 200). The insert holes 22a can correspond to the lock holes 11a (for example, three of the lock holes) adjacent to the insert holes 22a. An auxiliary plate 23 having plural penetrating holes 23a is secured to an inner side surface (in terms of a seat width direction) of the support wall portion 21 of the upper rail 4. The penetrating holes 23a can correspond to the lock holes 11a (for example, three of the lock holes) adjacent to the penetrating holes 23a.

A bracket 24 is secured to the upper rail 4 with the auxiliary plate 23. A lock plate 25 serving as a lock member is rotatably supported by a pivot pin 26. The lock plate 25 includes plural lock nails 25a (for example, three lock nails). The lock nails 25a can be inserted to/extracted from the penetrating holes 23a and the insert holes 22a as the lock plate 25 rotates. In other words, the lock nails 25a are provided so as to be sequentially inserted to the penetrating holes 23a and the insert holes 22a as the lock plate 25 rotates, and so as to be sequentially extracted from the insert holes 22a and the penetrating holes 23a as the lock plate 25 rotates. When the lock nails 25a is inserted to/extracted from the penetrating holes 23a and the insert holes 22a, the lock nails 25 can be inserted to/extracted from the lock holes 11a (for example, three of the lock holes 11a) adjacent to the penetrating holes 23a and the insert holes 22a.

When the lock plate 25 rotates in a first direction (counterclockwise in FIG. 5) and the lock nails 25a are inserted to the penetrating holes 23a, the lock holes 11a provided at the first bent portion 13, and the insert holes 22a, a movement of the upper rail 4 relative to the lower rail 3 is restricted. At this time, because the lock nails 25a are inserted to the lock holes 11a and also inserted to the penetrating holes 23a and the insert holes 22a, the lock holes 11a can be firmly held. Accordingly, the upper rail 4 is retained at a predetermined position within a movable range relative to the lower rail 3, and a position of the seat 200 supported by the upper rail 4 is also determined. The lock plate 25 is always biased to rotate in the first direction, in which the lock nails 25a are inserted to the lock holes 11a (counterclockwise in FIG. 5), by a spring 25d (illustrated in FIG. 1) provided around the pivot pin 26.

Further, a contact flange 25b, facing the lock nails 25a across the pivot pin 26, is provided at the lock plate 25. On the other hand, as illustrated in FIGS. 1 and 3, a slide lock release lever 28 serving as an operational member is provided at an inner surface (in terms of the seat width direction) of the support wall portion 21 of the upper rail 4. A center portion (in terms of a longitudinal direction) of the slide lock release lever 28 is rotatably supported to the inner surface of the support wall portion 21 of the upper rail 4 by a pin 29. A contact flange 28b is provided at a rear end (in terms of a longitudinal direction) of the slide lock release lever 28. The contact flange 28b is provided so as to face the contact flange 25b so that a lower surface of the contact flange 28b can contact with the contact flange 25b. Further, a holding portion 28c is formed at a front end (in terms of the longitudinal direction) of the slide lock release lever 28. An operational handle (not illustrated) is fitted to and held by the holding portion 28c. When the operational handle is operated, the slide lock release lever 28 is rotated about the pin 29 to rotate the lock plate 25 clockwise (clockwise in FIG. 5) against biasing force of the spring 25d through contact between the contact flanges 25b and 28b and thereby to release engagement between the lock nails 25a and the lock holes 11a.

Further, a contact flange 25c, facing the lock nails 25a across the pivot pin 26, is provided at the lock plate 25. The contact flange 25c penetrates the support wall portion 21 and protrudes to an outer side surface side (in terms of the seat width direction) of the support wall portion 21. On the other hand, as illustrated in FIGS. 2 and 6, a release lever 31 serving as a release member is rotatably supported to an outer side surface (in terms of the seat width direction) of the support wall portion 21 of the upper rail 4 by a pin 32. A contact pin 33 (illustrated in FIG. 2) is secured to an end portion of the release lever 31. The contact pin 33 is provided so as to face the contact flange 25c so that an outer peripheral surface of the contact pin 33 can contact with the contact flange 25c (illustrated in FIG. 5). The release lever 31 is always biased to rotate in a direction in which the contact pin 33 moves further from the contact flange 25c (clockwise in FIG. 2) by a spring 34 provided around the pin 32.

Figure 7A:
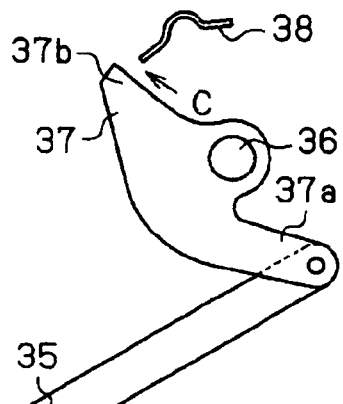
FIGS. 7A, 7B, and 7C represent explanatory diagrams illustrating an action of the seat apparatus according to the embodiment.
Figure 7B:
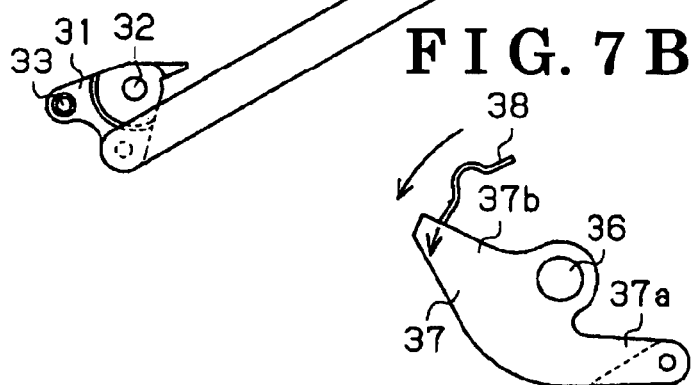
Figure 7C:
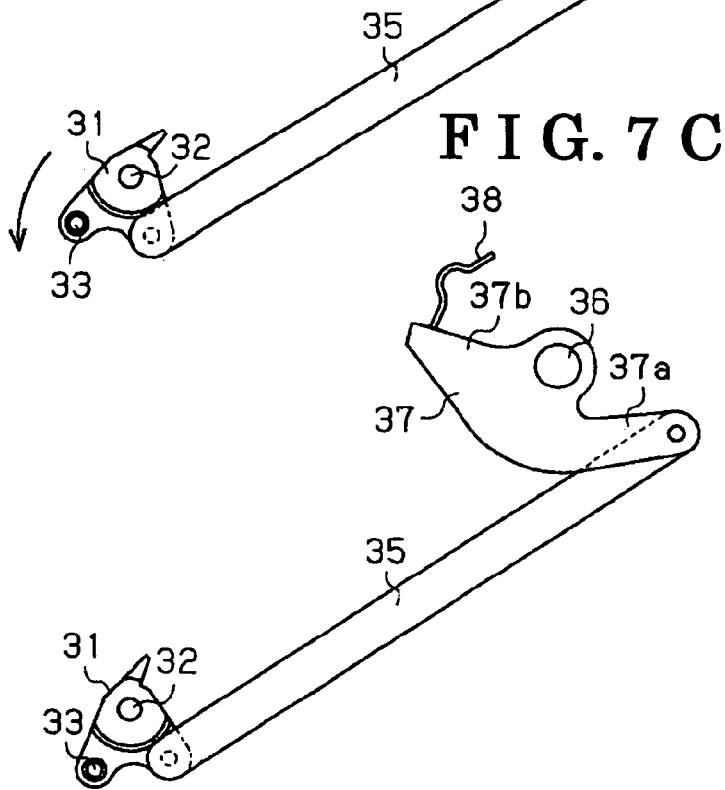

Further, a first end of a rod 35 is rotatably linked to an end portion of the release lever 31. As illustrated in FIGS. 7A-7C, a second end of the rod 35 is rotatably linked to a lever portion 37a of a reclining plate 37. The reclining plate 37 is rotatably supported to the seat cushion frame (not illustrated) by a pin 36. A shaft center of the pin 36 corresponds to a center of rotation of a seat back 202 relative to the seat cushion 201. An engaging portion 37b extends from the reclining plate 37. An engaging portion 38 is secured to a seat back flame (not illustrated), which is a skeletal portion of the seat back 202. The engaging portion 37b faces the engaging portion 38. As the seat back flame rotates about the pin 36 relatively to the seat cushion flame, the engaging portion 38 presses the engaging portion 37b. As illustrated in FIG. 7A, when the seat back 202 is at a tilt angle at which an occupant can sit on the seat 200 and can utilize the seat 200 normally, a clearance C is set between the engaging portions 37b and 38 so that the engaging portions 37b and 38 do not contact with each other. Further, as illustrated in FIGS. 7B and 7C, as the seat back flame rotates in a first direction (counter clockwise in FIGS. 7A-7C), when the seat back 202 tilts forward over a predetermined angle, the engaging portion 37b of the reclining plate 37 is pressed by the engaging portion 38 and the reclining plate 37 rotates in the first direction (counter clockwise in FIGS. 7A-7C) as the engaging portion 37b is pressed by the engaging portion 38. Then, as the reclining plate 37 rotates, the reclining plate 37 pulls the rod 35 through the lever portion 37a to rotate the release lever 31 in the first direction (counterclockwise in FIGS. 7A-7C) against biasing force of the spring 34.

At this time, the contact pin 33, which is secured to the release lever 31, presses the contact flange 25c of the lock plate 25. In other words, the release lever 31 rotates about the pin 32 as the seat back 202 tilts over the predetermined angle to rotate the lock plate 25 clockwise (in terms of FIG. 5) against biasing force of the spring 25d through contact of the contact flange 25c with the contact pin 33 and thereby to release engagement between the lock nails 25a and the lock holes 11a. Thus, the release lever 31 or the like for releasing a lock, operable in association with a tilt of the seat back 202 over the predetermined angle, configures so called a walk-in mechanism.

As illustrated in FIGS. 2 and 3, a memory release lever 41 serving as a memory release member is rotatably supported to an outside surface (in terms of the seat width direction) of the support wall portion 21 of the upper rail 4 by the pin 29. The memory release lever 41 is relatively rotatably linked to the slide lock release lever 28. Then, as illustrated in FIGS. 8A-8D, an engaging portion 41a is formed at a rear end (in terms of a longitudinal direction) of the memory release lever 41. The engaging portion 41a is placed on the lower rail 3 so that the engaging portion 41a penetrates the wall portion 20 of the upper rail 4. As illustrated in FIG. 5, a lower end of the engaging portion 41a protrudes in the lower rail 3 along a centerline of the lower rail 3.

Further, a long hole 41b is formed at a middle portion (in terms of a longitudinal direction) of the memory release lever 41 extending in a circumferential direction of the pin 29. On the other hand, as illustrated in FIGS. 2 and 4, an engaging pin 42 is secured to the slide lock release lever 28. The engaging pin 42 penetrates the support wall portion 21 of the upper rail 4 and is inserted to the long hole 41b. Accordingly, a relative rotatable range between the slide lock release lever 28 and the memory release lever 41 is restricted by a movable range of the engaging pin 42 in the long hole 41b.

Then, the memory release lever 41 is always biased to rotate in a direction in which the engaging portion 41a moves closer to the lower rail 3 side (clockwise in FIG. 2) by a spring 43 provided around the pin 29. Precisely, a first end of the spring 43 engages with the memory release lever 41, and a second end of the spring 43 engages with the engaging pin 42.

Then, the spring 43 biases an inner wall surface of a first side (counter clockwise side in FIGS. 8A-8D) of a periphery of the long hole 41b of the memory release lever 41 so that the first side of the periphery of the long hole 41b contacts with the engaging pin 42. Accordingly, the memory release lever 41 engages with the engaging pin 42 so that the memory release lever 41 is always biased to rotate in a direction in which the engaging portion 41a moves closer to the lower rail 3 side.

In the meantime, a spring 28d (illustrated in FIG. 1) always biases the slide lock release lever 28 to rotate in a direction in which the contact flange 28b moves further from the contact flange 25b. Accordingly, the slide lock release lever 28 releases engagement between the lock nails 25a and the lock holes 11a as described above as the slide lock release lever 28 rotates around the pin 29 against biasing force of the spring 28d when the operational handle is operated.

Figure 8A:
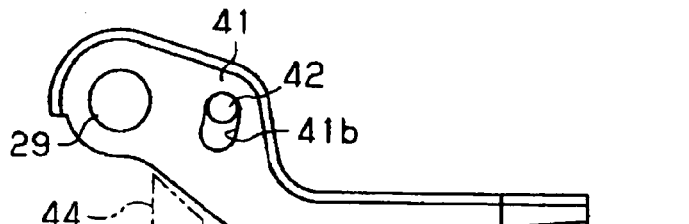
FIGS. 8A, 8B, 8C, and 8D represent explanatory diagrams also illustrating an action of the seat apparatus according to the embodiment.
Figure 8A:
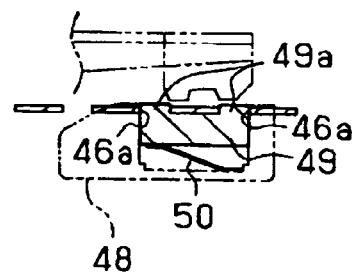
Figure 8B:
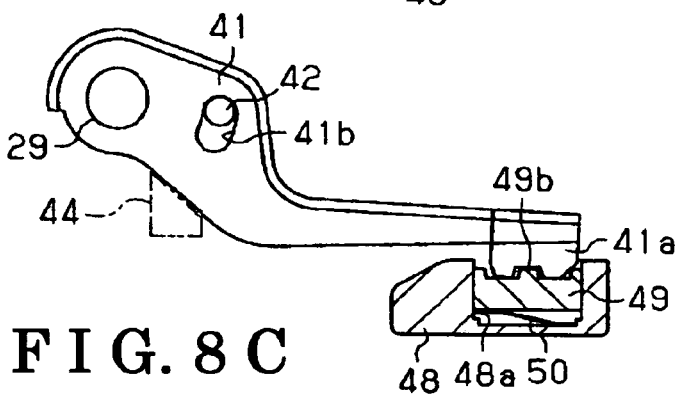
Figure 8B:
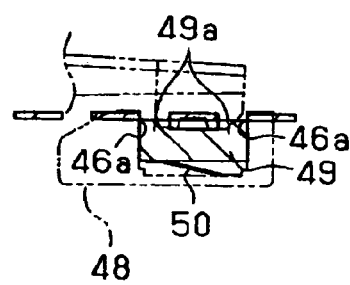
Figure 8C:
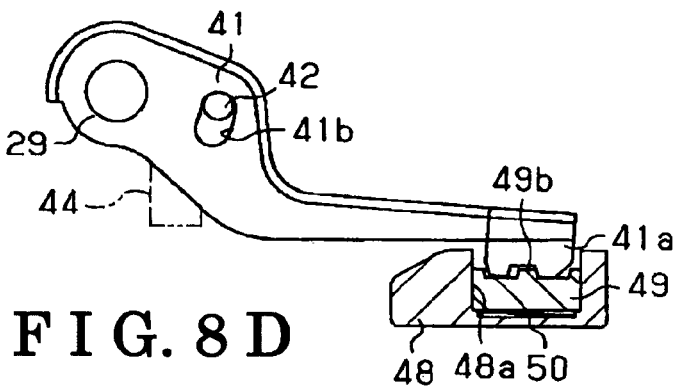
Figure 8C:
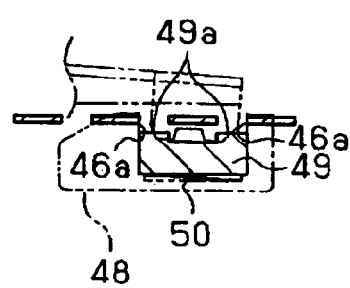

Here, a restriction wall portion 44, serving as a restricting member for restricting rotation of the memory release lever 41 over the predetermined range in a first direction (clockwise in FIGS. 8A-8D), is provided at the upper rail 4. Accordingly, as illustrated in FIGS. 8A, 8B, and 8C, until the rotation of the memory release lever 41 in the first direction is restricted by the restriction wall portion 44, the memory release lever 41 rotates together with rotation of the slide lock release lever 28 when the operational handle is operated. In other words, the memory release lever 41 is operable with the slide lock release lever 28. At this time, because the inner wall surface of the long hole 41b contacts with the engaging pin 42, the memory release lever 41 integrally rotates with the slide lock release lever 28. At this time, as illustrated in FIGS. 9A and 9B, the slide lock release lever 28 rotates the lock plate 25 clockwise in FIGS. 9A-9C through contact of the contact flange 25b with the contact flange 28b. However, the slide lock release lever 28 has not released engagement between the lock nails 25a and the lock holes 11a yet.

Figure 8D:
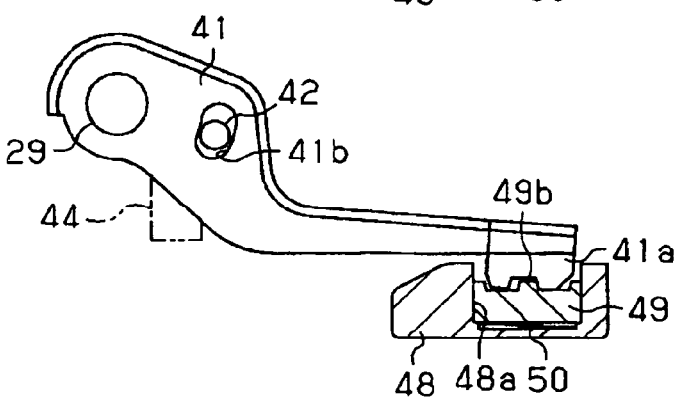
Figure 8D:
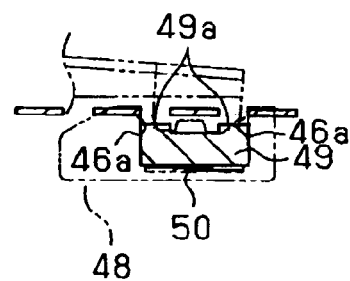
Figure 9A:
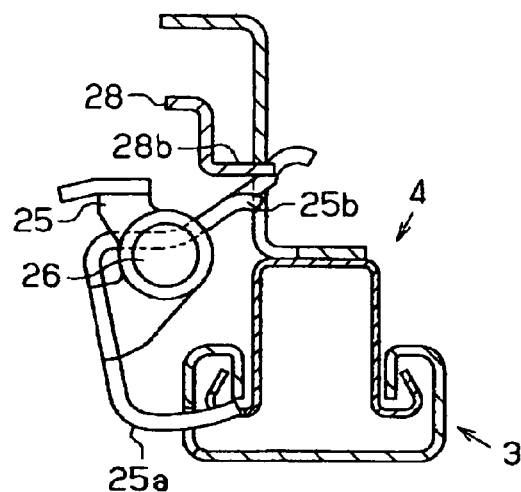
FIGS. 9A, 9B, and 9C represent explanatory diagrams also illustrating an action of the seat apparatus according to the embodiment.
Figure 9B:
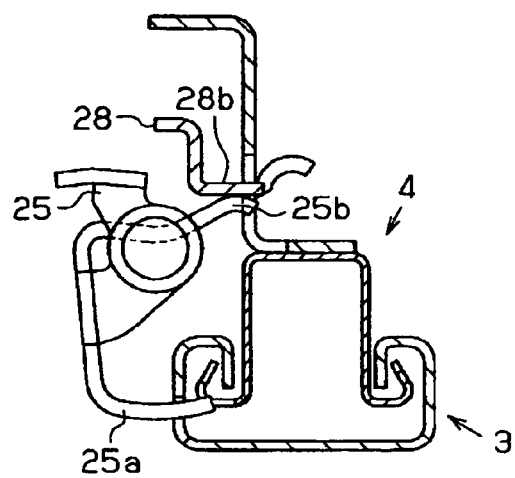
Figure 9C:
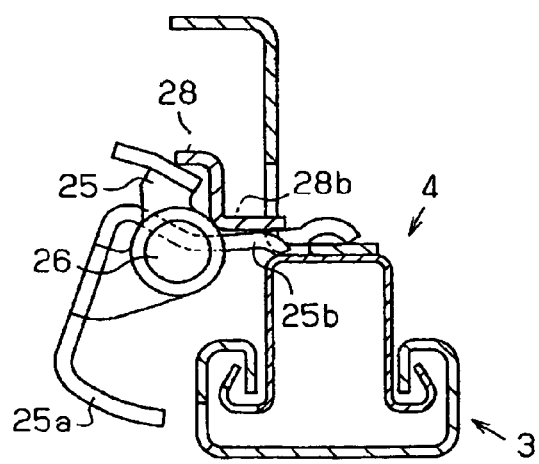

Then, as illustrated in FIG. 8D, in a state where the rotation of the memory release lever 41 in the first direction is restricted by the restriction wall portion 44, the slide lock release lever 28 is further rotated in the first direction as the operational handle is further operated. At this time, the engaging pin 42 moves in the long hole 41b. Thus, as illustrated in FIG. 9C, the slide lock release lever 28 completes releasing the engagement between the lock nails 25a and the lock holes 11a.

Figure 11A:
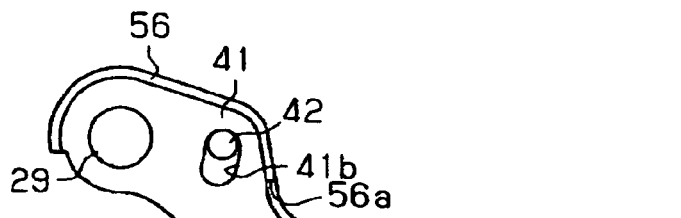
FIGS. 11A, 11B, 11C, and 11D represent explanatory diagrams illustrating an action of a seat apparatus according to an additional embodiment.
Figure 11B:
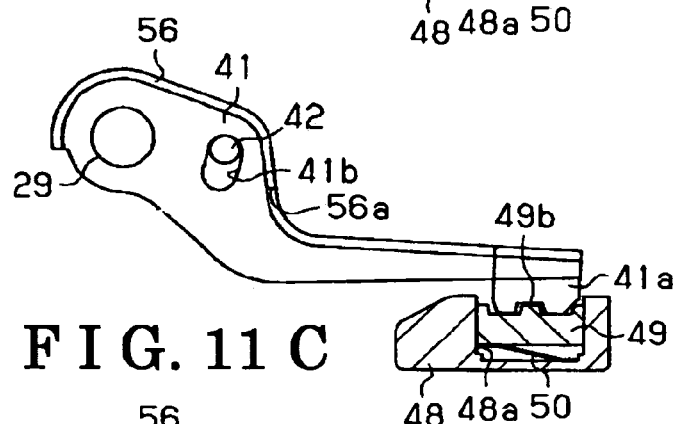
Figure 11B:
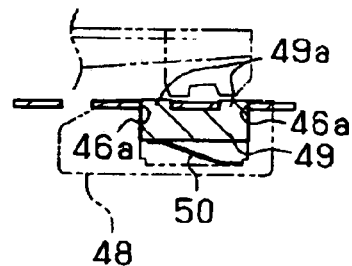
Figure 11C:
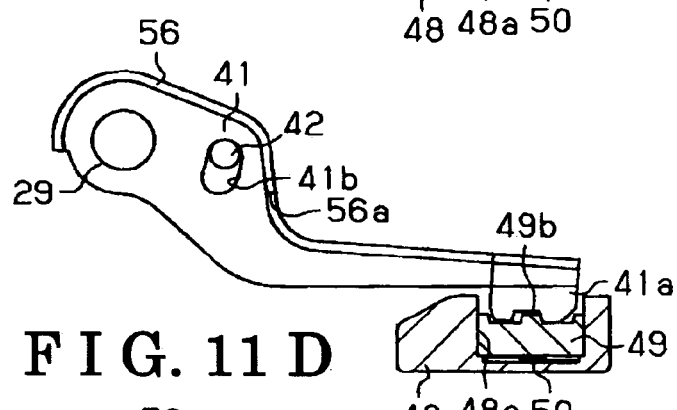
Figure 11C:
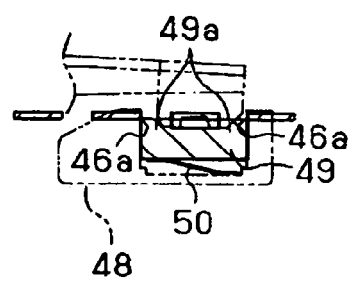
Figure 11D:
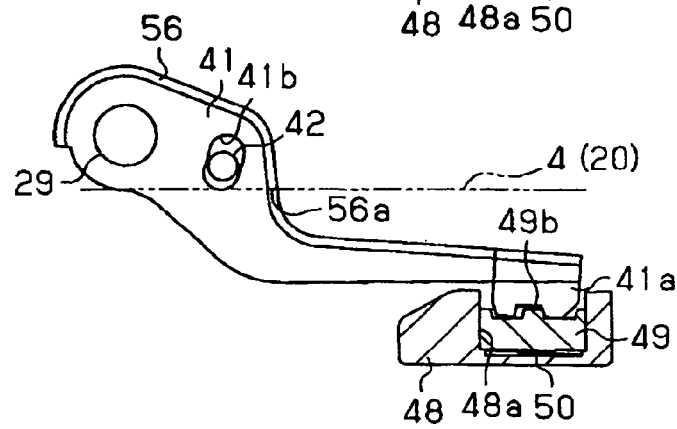
Figure 11D:
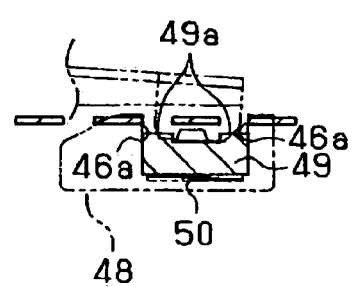
Figure 11D:
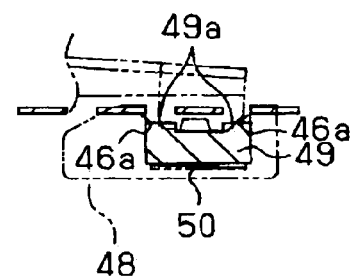

In other words, the slide lock lever 28 further rotates around the pin 29 while the engaging pin 42 moves in the long hole 41b until a movement of the engaging pin 42 is restricted by the long hole 41b to complete releasing the engagement between the lock nails 25a and the lock holes 11a. Accordingly, a release stroke of the slide lock release lever 28 for releasing a lock is defined by contact of the engaging pin 42 with the long hole 41b. In the meantime, the release stroke of the slide lock release lever 28 can be defined by contact of the lock plate 25 with the upper rail 4. At this time, the long hole 41b can be formed in size equal to or larger than a restriction of the movable range of the engaging pin 42. Further, as illustrated in FIGS. 11A, 11B, and 11C, a restriction wall portion 56 of a flange shape can be provided at an upper periphery of the memory release lever 28 around the pin 29. As illustrated in FIG. 11D, when an end surface 56a of the restriction wall portion 56 contacts with an upper surface of the upper rail 4 (wall portion 20), further rotation of the memory release lever 41 relative to the upper rail 4 in the first direction (clockwise in FIG. 11D) out of a predetermined range (movable range) is restricted.

As illustrated in FIGS. 3 to 5, a memory rail 46 is secured to the bottom portion 12 of the lower rail 3 so that the memory rail 46 is placed in the accommodating space S. In other words, the memory rail 46 is secured to the floor 100 of the vehicle through the lower rail 3. The memory rail 46 has an approximate U-shape cross-section. Opening side portions of the memory rail 46 are bent inside (in terms of the seat width direction). The memory rail 46 extends in the longitudinal direction of the lower rail 3, in other words, the fore-aft direction of the vehicle. A centerline of the memory rail 46 approximately corresponds to a centerline of the lower rail 3. Plural engaging grooves 46a are provided at end portions of the memory rail 46 bent inside (in terms of the seat width direction). The engaging grooves 46a are arranged in a longitudinal direction of the memory rail 46 at a predetermined interval. The interval of the engaging grooves 46a is approximately equal to an interval of the lock holes 11a.

As illustrated in FIG. 5, a memory slider 47 serving as a memory member is provided at the memory rail 46. The memory slider 47 is in the accommodating space S with the memory rail 46. The memory slider 47 includes a slider body 48 slidably provided at the memory rail 46. The slider body 48 includes an outer wall surface corresponding to an inner wall surface of the memory rail 46. The memory slider 47 further includes an engaging body 49 accommodated in an accommodating recessed portion 48a formed at the slider body 48. The accommodating recessed portion 48a opens upward. The engaging body 49 is biased by a spring 50 provided between a lower surface of the engaging body 49 and a bottom surface of the accommodating recessed portion 48a so that the engaging body 49 protrudes upward.

As illustrated in FIGS. 8A-8D, plural fitting portions 49a (for example, two fitting portions) are provided at the engaging body 49. The fitting portions 49a can fit in/extracted from the engaging grooves 46a. The fitting portions 49a are provided at both sides (in terms of the seat width direction) of the engaging body 49. The engaging body 49 is biased by the spring 50 so that the fitting portions 49a fit in the engaging grooves 46a. Then, the engaging body 49 restricts a slide of the slide body 48 relative to the memory rail 46, in other words, a movement of the memory slider 47 relative to the memory rail 46.

Further, an engaging portion 49b is formed at the engaging body 49. On the other hand, a stopper 51 (illustrated in FIG. 2) is secured to the upper rail 4. The stopper 51 can contact with a front end of the slider body 48. Accordingly, in a state where a slide of the slider body 48 relative to the memory rail 46 is restricted, a movement of the upper rail 4 rearward is restricted when the stopper 51 contacts with the slider body 48.

Here, the lock plate 25 can restrict a movement of the upper rail 4 relative to the lower rail 3 in a state where the stopper 51 contacts with or almost contacts with the slider body 48. As illustrated in FIG. 8A, in this state, a lower surface of the engaging portion 41a of the memory release lever 41 linked to the upper rail 4 is placed to face the engaging portion 49b of the engaging body 49 so that the lower surface of the engaging portion 41a can engage with the engaging portion 49b. In other words, the engaging portion 41a is placed so that the engaging portion 41a can press the engaging body 49.

Then, as illustrated in FIGS. 8B and 8C, when the memory release lever 41 rotates in the first direction (clockwise in FIGS. 8A-8D) as the slide lock release lever 28 rotates together with the operation of the operational handle, the memory release lever 41 presses the engaging body 49 downward against biasing force of the spring 50 while the engaging portion 41a of the memory release lever 41 sandwiches the engaging portion 49b of the engaging body 49 to engage with the engaging portion 49b. By doing so, the fitting portions 49a fitted in the engaging grooves 46*a* are extracted (disengaged). Accordingly, a restriction of a slide of the slider body 48 relative to the memory rail 46, in other words, a restriction of a movement of the memory slider 47 relative to the memory rail 46, is released.

In other words, a movement of the memory slider 47 relative to the memory rail 46 is basically restricted when a movement of the upper rail 4 relative to the lower rail 3 is restricted (restricted state) by the lock plate 25. Then, as the memory release lever 41 rotates in the first direction to engage with the memory slider 47, the restriction of the movement of the memory slider 47 relative to the memory rail 46 is released.

Then, when the restriction of the movement of the upper rail 4 relative to the lower rail 3 is released by the slide lock release lever 28, because the engaging portion 49*b* of the engaging body 49 engages with the engaging portion 41*a* of the memory release lever 41 and the slider body 48 is pressed by the engaging body 49, as the upper rail 4 moves relatively to the lower rail 3, the slider body 48 (memory slider 47) slides along the memory rail 46. By doing so, the memory slider 47 integrally moves with the upper rail 4 relative to the memory rail 46.

Figure 10:
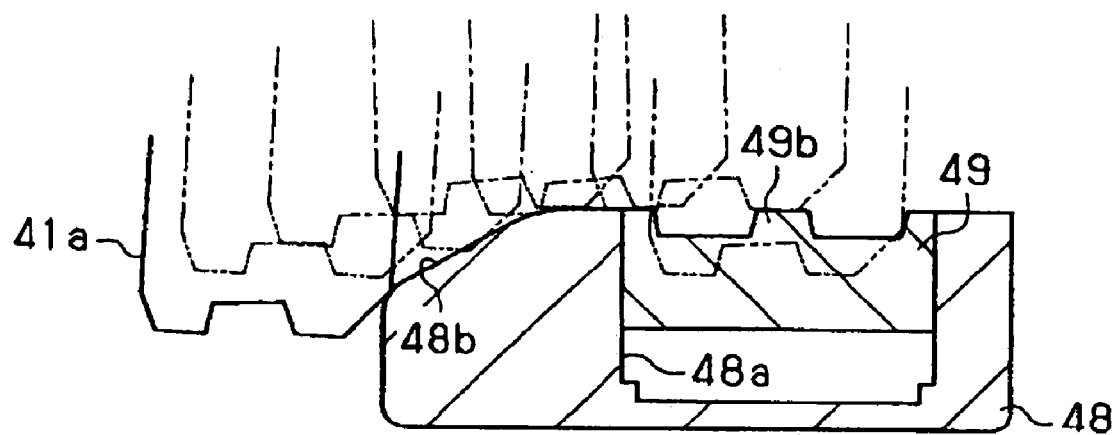
FIG. 10 represents an explanatory diagram also illustrating an action of the seat apparatus according to the embodiment.

On the other hand, when the restriction of the movement, of the upper rail 4 relative to the lower rail 3 is released by the release lever 31 as the seat back 202 tilts over the predetermined angle, the slide of the slider body 48 relative to the memory rail 46, in other words, the movement of the memory slider 47 relative to the memory rail 46, is kept to be restricted (restricted state). At this time, the upper rail 4 is permitted only to move toward a front of the slider body 48 (memory slider 47) by the stopper 51. Further, the upper rail 4 having moved forward moves rearward until the stopper 51 contacts with the slider body 48. By doing so, a position of the upper rail 4 relative to the lower rail 3 before the upper rail 4 moves forward can be retrieved. Then, the engaging portion 41*a* returns to a position where the engaging portion 41*a* can press the engaging body 49. In the meantime, there can be a case where a user tilts the seat back 202 over the predetermined angle, moves the upper rail 4 forward in front of the slider body 48 (memory slider 47), returns the seat back 202 into an initial state (seating state, the movement of the upper rail 4 relative to the lower rail 3 is restricted at this state), operates the operational handle to release the restriction of the movement of the upper rail 4 relative to the lower rail 3 (the slide lock lever 28 is rotated at this time), and moves the upper rail 4 backward while the seat 200 is in the initial state. In this situation where the slide lock release lever 28 is rotated (in other words, the memory release lever 41 is pushed downward toward the lower rail 3), as illustrated in FIG. 10, the engaging portion 41*a* of the memory release lever 41 can be guided to a guide surface 48*b* of the slider body 48 (memory slider 47) as the upper rail 4 moves backward. Thus, the memory release lever 41 comes to engage with the slider body 48. In other words, the engaging portion 41*a* comes to engage with the engaging portion 49*b*.

As detailed above, according to the embodiment, effects described below can be obtained. According to the embodiment, when the slide lock release lever 28 (operational handle) is operated by a user, the restriction of the movement of the upper rail 4 (seat 200) relative to the lower rail 3 (the floor 100 of the vehicle) by the lock plate 25 is released. At this time, because the memory slider 47 engages with the memory release lever 41, the restriction of the movement of the memory slider 47 relative to the memory rail 46 is released. Accordingly, the memory slider 47 integrally moves with the upper rail 4. Then, when the operation of the slide lock release lever 28 is finished (operational handle is released), the movement of the upper rail 4 relative to the lower rail 3 is restricted by the lock plate 25, and the movement of the memory slider 47 relative to the memory rail 46 is also restricted. In other words, when the upper rail 4 moves as the operational handle (slide lock release lever 28) is operated, a position of the memory slider 47 relative to the memory rail 46 corresponds to a position of the upper rail 4 relative to the lower rail 3.

On the other hand, when the seat back 202 is tilted by a user over the predetermined angle, the restriction of the movement of the upper rail 4 (seat 200) relative to the lower rail (the floor 100 of the vehicle) by the lock plate 25 is released by the release lever 31 operable in association with the tilt of the seat back 202. At this time, the movement of the memory slider 47 relative to the memory rail 46 is kept to be restricted (restricted state) when the upper rail 4 moves forward. Then, when the upper rail 4 moves backward, the memory slider 47 engages with the upper rail 4 so that a position of the upper rail 4 relative to the lower rail 3 before the upper rail 4 moves forward is retrieved.

As described above, because actions of the memory slider 47 can be switched by two separate operations (operation of the slide lock release lever 28, a tilt of the seat back 202), the movement of the upper rail 4 relative to the lower rail 3, in other words, operation regarding an adjustment of a seat position, can be separately utilized for two situations described above in a clear manner. Accordingly, operationality can be improved regarding the adjustment of the seat position.

According to the embodiment, because the memory rail 46 and the memory slider 47 are placed in the accommodating space S formed inside the lower rail 3 (inside the cross-section of the lower rail 3), components need not to be positioned outside the lower rail 3 (outside the cross-section of the lower rail 3). Accordingly, downsizing can be expected. Further, because components are inhibited from being exposed outside, interference in surrounding components can be inhibited.

According to the embodiment, the memory release lever 41 stops operating while the slide lock release lever 28 continues to operate before a release of the restriction of the movement of the upper rail 4 relative to the lower rail 3 by the slide lock release lever 28 is completed. Thus, the release of the restriction of the movement of the memory slider 47 relative to the memory rail 46 is completed. By doing so, operational force for completing the release of the restriction of the movement of the upper rail 4 relative to the lower rail 3 by the slide lock release lever 28 can be inhibited from being applied to the memory slider 47 through the memory release lever 41 to the last. Generally, operational force for completing the release of the restriction of the movement of the upper rail 4 relative to the lower rail 3 by the slide lock release lever 28 becomes larger than operational force required for completing the release of the restriction of the movement of the memory slider 47 relative to the memory rail 46 by the memory release lever 41. Accordingly, when the memory release lever 41 continues to operate with the slide lock release lever 28 until the release of the restriction of the movement of the upper rail 4 relative to the lower rail 3 by the slide lock release lever 28, there can be a case where operational force is unnecessarily applied to the memory slider 47. Then, resistance (slide resistance) of the memory slider 47 (slider body 48) relative to the memory slider 46 increases when the memory slider 47 integrally moves with the upper rail 4 (when the memory slider 47 moves relatively to the memory rail 46). However, because the memory release lever 41 stops operating while the slide lock release lever 28 continues to operate before the release of the restriction of the movement of the upper rail 4 relative to the lower rail 3 by the slide lock release lever 28 is completed, increase in the resistance (slide resistance) can be inhibited, and the movement of the upper rail 4 relative to the lower rail 3, in other words, the adjustment of the seat position, can be smoothly carried out.

According to the embodiment, because the slide lock release lever 28 and the memory release lever 41 are concentrically provided, a link action therebetween can be simply set. In the meantime, the embodiment can employ following changes.

In the embodiment described above, a description of transmission of operational force to the slide lock release lever 28 linked to the operation of the operational handle is one example. Similarly, a description of transmission of operational force to the memory release lever 41 through the slide lock release lever 28 is one example. For example, though the slide lock release lever 28 and the memory release lever 41 were concentrically provided along the pin 29 in the embodiment described above, a rotational center of the slide lock release lever 28 can be shifted from a rotational center of the memory release lever 41. Further, the slide lock release lever and the memory release lever can be integrally provided, or integrally formed.

In the embodiment described above, a description of transmission of operational force to the release lever 31 as the seat back 202 tilts is one example. For example, the release lever 31 can be connected with the reclining plate 37 through a cable, or the like.

In the embodiment described above, the memory rail 46 can be integrally formed with the lower rail 3. For example, a shape according to the engaging grooves 46a can be formed by notching a part of the lower rail. Further, the memory rail 46 can be provided outside the accommodating space S of the lower rail 3. In short, the memory rail 46 can be suitably configured if the memory rail 46 is substantially secured to the floor 100 of the vehicle.

In the embodiment described above, the memory rail 46, the memory slider 47, and so on, may be provided only at a lower rail 3 provided at a first side (in terms of the seat width direction). In this case, in a configuration in which the movement of the upper rail 4 relative to the lower rail 3 is restricted by the lock plate at lower rails provided at both sides (in terms of the seat width direction), a release action of a restriction at a second side can be linked to a release of a restriction at a first side by means of a link, cable, or the like.

In the embodiment described above, the number of lock nails 25a provided at the lock plate 25 can be one or more, and the number of lock holes 11a to which the lock nails 25a are inserted can be one or more.

In the embodiment described above, if the second bent portion 22 of the upper rail 4 is not provided on traces of the lock nails 25a, which are inserted to the lock holes 11a, the insert holes 22a can be removed. Further, the auxiliary plate 23 can also be removed.

In the embodiment described above, the seat apparatus 1 for a vehicle can include three or more lower rails and three or more upper rails. Further, in a condition where sufficient strength and stability can be ensured, the seat apparatus 1 for a vehicle can include only one lower rail and one upper rail.

In the embodiment described above, a moving direction of the seat 200 when the upper rail moves relatively to the lower rail can be the seat width direction. In the embodiment described above, the seat apparatus 1 according to the embodiment of the present invention can be provided not only at a front seat (driver seat, assistant seat), but can be provided also at a rear seat.

In following, technical concepts which can be grasped from the embodiment and additional embodiments described above will be mentioned. In the seat apparatus for a vehicle, the memory rail includes a plurality of engaging grooves provided at the memory rail and arranged in a longitudinal direction of the memory rail, the memory member includes a slider body slidable along the memory rail, an engaging body accommodated in an accommodating recessed portion formed at the slider body and biased by a biasing member so that the engaging body is fitted in the engaging grooves for restricting a slide of the slider body along the memory rail, and when the restriction of the movement of the second rail relative to the first rail is released by the operational member, the engaging body is pressed by the memory release member and engages with the memory release member so that the memory member is disengaged from the engaging grooves against the biasing member, so that the restriction of the movement of the memory member relative to the memory rail is released, and so that the memory member integrally moves with the second rail.

In the seat apparatus, the second rail includes an engaging member, and when the restriction of the movement of the second rail relative to the first rail is released by the release member, the memory release member is disengaged from the engaging body and the movement of the memory member relative to the memory rail is restricted while the second rail moves in the first direction, and the engaging member engages with the slider body as the second rail moves in the second direction so that the position of the second rail relative to the first rail before the second rail moves in the first direction can be retrieved and the memory release member is guided to the slider body so that the memory release member can press the engaging body.

According to a first aspect of the present invention, a seat apparatus for a vehicle includes a first rail secured to a floor of the vehicle, a second rail secured to a seat and relatively movable to the first rail, a lock member for restricting a movement of the second rail relative to the first rail, an operational member for engaging with the lock member to release a restriction of the movement of the second rail relative to the first rail exerted by the lock member, a memory release member operable with the operational member, a release member operable in association with a tilt of a seat back over a predetermined angle for engaging with the lock member to release the restriction of the movement of the second rail relative to the first rail exerted by the lock member, and a memory member of which a movement relative to the floor of the vehicle is restricted when the movement of the second rail relative to the first rail is restricted by the lock member. When the restriction of the movement of the second rail relative to the first rail is released by the operational member, the memory release member engages with the memory member so that a restriction of the movement of the memory member relative to the floor of the vehicle is released and so that the memory member integrally moves with the second rail. On the other hand, when the restriction of the movement of the second rail relative to the first rail is released by the release member, the movement of the memory member relative to the floor of the vehicle is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

According to a second aspect of the present invention, a seat apparatus for a vehicle includes a first rail secured to a floor of the vehicle, a second rail secured to a seat and relatively movable to the first rail, a lock member for restricting a movement of the second rail relative to the first rail, an operational member for engaging with the lock member to release a restriction of the movement of the second rail relative to the first rail exerted by the lock member, a memory release member operable with the operational member, a release member operable in association with a tilt of a seat back over a predetermined angle for engaging with the lock member to release the restriction of the movement of the second rail relative to the first rail exerted by the lock member, a memory rail secured to the floor of the vehicle, and a memory member of which a movement relative to the memory rail is restricted when the movement of the second rail relative to the first rail is restricted by the lock member. When the restriction of the movement of the second rail relative to the first rail is released by the operational member, the memory release member engages with the memory member so that a restriction of the movement of the memory member relative to the memory rail is released and so that the memory member integrally moves with the second rail. On the other hand, when the restriction of the movement of the second rail relative to the first rail is released by the release member, the movement of the memory member relative to the memory rail is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

According to a third aspect of the present invention, in the seat apparatus according to the second aspect, the first rail includes an accommodating space, and the memory rail and the memory member are placed in the accommodating space.

According to a fourth aspect of the present invention, in the seat apparatus according to the second or third aspect, the memory release member stops operating while the operational member continues to operate after a release of the restriction of the movement of the memory member relative to the memory rail is completed before a release of the restriction of the movement of the second rail relative to the first rail by the operational member is completed.

According to a fifth aspect of the present invention, in the seat apparatus according to the fourth aspect, the operational member is rotatably connected to the second rail and includes an engaging pin, the memory release member is rotatably connected to the second rail and includes a long hole to which the engaging pin is inserted, the seat apparatus includes a restricting member provided either one of the second rail and the memory release member, the memory release member rotates together with rotation of the operational member to release the restriction of the movement of the memory member relative to the memory rail until the memory release member engages with the second rail through the restricting member, and the operational member rotates, as the engaging pin moves in the long hole, relatively to the memory release member to release the restriction of the movement of the second rail relative to the first rail after a rotational movement of the memory release member is restricted.

As detailed above, according to the first aspect, when the operational member is operated by a user, the restriction of the movement of the second rail (seat) relative to the first rail (floor of the vehicle) exerted by the lock member is released. At this time, the memory member engages with the memory release member to release the restriction of the movement of the memory member relative to the floor of the vehicle and thereby to integrally move with the second rail. Then, when the operation of the operational member is finished, the movement of the second rail relative to the first rail is restricted by the lock member and the movement of the memory member relative to the floor of the vehicle is also restricted. In other words, when the operational member is operated, as the second rail moves relatively to the first rail, the memory member also moves relatively to the floor of the vehicle so that the position of the memory member relative to the floor of the vehicle corresponds to the position of the second rail relative to the first rail.

On the other hand, when the seat back is tilted by a user over the predetermined angle, the release member operable in association with a tilt of the seat back releases the restriction of the movement of the second rail (seat) relative to the first rail (floor of the vehicle) exerted by the lock member. At this time, the movement of the memory member relative to the floor of the vehicle is restricted while the second rail moves in the first direction and after that the second rail moves in the second direction. The memory member comes to engage with the second rail as the second rail moves in the second direction so that a position of the second rail relative to the first rail before the second rail moves in the first direction can be retrieved.

As described above, because actions of the memory member can be switched by two separate operations (operation of the operational member, a tilt of the seat back), the movement of the second rail relative to the first rail, in other words, operations regarding an adjustment of a seat position, can be separately utilized for two situations described above in a clear manner. Accordingly, operationality can be improved regarding the adjustment of the seat position.

According to the second aspect, when the operational member is operated by a user, the restriction of the movement of the second rail (seat) relative to the first rail (floor of the vehicle) exerted by the lock member is released. At this time, the memory member engages with the memory release member to release the restriction of the movement of the memory member relative to the memory rail and thereby to integrally move with the second rail. Then, when the operation of the operational member is finished, the movement of the second rail relative to the first rail is restricted by the lock member, and the movement of the memory member relative to the memory rail is also restricted. In other words, when the operational member is operated, as the second rail moves relatively to the first rail, the memory member also moves relatively to the memory rail so that the position of the memory member relative to the memory rail corresponds to the position of the second rail relative to the first rail.

On the other hand, when the seat back is tilted by a user over the predetermined angle, the release member operable in association with the tilt of the seat back releases the restriction of the movement of the second rail (seat) relative to the first rail (floor of the vehicle) by the lock member. At this time, the movement of the memory member relative to the memory rail is restricted while the second rail moves in the first direction and after that the second rail moves in the second direction. The memory member comes to engage with the second rail as the second rail moves in the second direction so that a position of the second rail relative to the first rail before the second rail moves in the first direction can be retrieved.

As described above, because actions of the memory member can be switched by two separate operations (operation of the operational member, a tilt of the seat back), the movement of the second rail relative to the first rail, in other words, operations regarding an adjustment of a seat position, can be separately utilized for two situations described above in a clear manner. Accordingly, operationality can be improved regarding the adjustment of the seat position.

According to the third aspect, components need not to be positioned outside the rail. Accordingly, downsizing can be expected. Further, because components are inhibited from being exposed outside, interference in surrounding components can be inhibited.

According to the fourth or fifth aspect, operational force for completing the release of the restriction of the movement of the second rail relative to the first rail by the operational member can be inhibited from being applied to the memory member through the memory release member to the last. Generally, operational force for completing the release of the restriction of the movement of the second rail relative to the first rail by the operational member becomes larger than operational force required for completing the release of the restriction of the movement of the memory member relative to the memory rail by the memory release member. Accordingly, when the memory release member continues to operate with the operational member until the release of the restriction of the movement of the second rail relative to the first rail by the operational member, there can be a case where the operational force is unnecessarily applied to the memory member. Then, resistance (slide resistance) of the memory member relative to the memory rail increases when the memory member integrally moves with the second rail (when the memory member moves relatively to the memory rail). However, the memory release member stops operating while the operational member continues to operate before the release of the restriction of the movement of the second rail relative to the first rail by the operational member is completed. Accordingly, increase in the resistance (slide resistance) can be inhibited, and the movement of the second rail relative to the first rail, in other words, the adjustment of the seat position, can be smoothly carried out.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:

a first rail secured to a floor of the vehicle;

a second rail secured to a seat and relatively movable to the first rail;

a lock member for restricting a movement of the second rail relative to the first rail;

an operational member for engaging with the lock member to release a restriction of the movement of the second rail relative to the first rail exerted by the lock member;

a memory release member operable with the operational member;

a release member operable in association with a tilt of a seat back over a predetermined angle for engaging with the lock member to release the restriction of the movement of the second rail relative to the first rail exerted by the lock member; and a memory member of which a movement relative to the floor of the vehicle is restricted when the movement of the second rail relative to the first rail is restricted by the lock member, wherein when the restriction of the movement of the second rail relative to the first rail is released by the operational member, the memory release member engages with the memory member so that a restriction of the movement of the memory member relative to the floor of the vehicle is released and so that the memory member integrally moves with the second rail, on the other hand, when the restriction of the movement of the second rail relative to the first rail is released by the release member, the movement of the memory member relative to the floor of the vehicle is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

2. A seat apparatus for a vehicle, comprising:

a first rail secured to a floor of the vehicle;

a second rail secured to a seat and relatively movable to the first rail;

a lock member for restricting a movement of the second rail relative to the first rail;

an operational member for engaging with the lock member to release a restriction of the movement of the second rail relative to the first rail exerted by the lock member;

a memory release member operable with the operational member;

a release member operable in association with a tilt of a seat back over a predetermined angle for engaging with the lock member to release the restriction of the movement of the second rail relative to the first rail exerted by the lock member;

a memory rail secured to the floor of the vehicle; and a memory member of which a movement relative to the memory rail is restricted when the movement of the second rail relative to the first rail is restricted by the lock member, wherein when the restriction of the movement of the second rail relative to the first rail is released by the operational member, the memory release member engages with the memory member so that a restriction of the movement of the memory member relative to the memory rail is released and so that the memory member integrally moves with the second rail, on the other hand, when the restriction of the movement of the second rail relative to the first rail is released by the release member, the movement of the memory member relative to the memory rail is restricted while the second rail moves in a first direction and after that the second rail moves in a second direction so that the memory member engages with the second rail as the second rail moves in the second direction and so that a position of the second rail relative to the first rail before the second rail moves in the first direction can be retrieved.

3. The seat apparatus according to claim 2, wherein the first rail includes an accommodating space, and the memory rail and the memory member are placed in the accommodating space.

4. The seat apparatus according to claim 2, wherein
the memory release member stops operating while the operational member continues to operate after a release of the restriction of the movement of the memory member relative to the memory rail is completed before a release of the restriction of the movement of the second rail relative to the first rail by the operational member is completed.

5. The seat apparatus according to claim 4, wherein
the operational member is rotatably connected to the second rail and includes an engaging pin, the memory release member is rotatably connected to the second rail and includes a long hole to which the engaging pin is inserted, the seat apparatus includes a restricting member provided either one of the second rail and the memory release member, the memory release member rotates together with rotation of the operational member to release the restriction of the movement of the memory member relative to the memory rail until the memory release member engages with the second rail through the restricting member, and the operational member rotates, as the engaging pin moves in the long hole, relatively to the memory release member to release the restriction of the movement of the second rail relative to the first rail after a rotational movement of the memory release member is restricted.

6. The seat apparatus according to claim 3, wherein
the memory release member stops operating while the operational member continues to operate after a release of the restriction of the movement of the memory member relative to the memory rail is completed before a release of the restriction of the movement of the second rail relative to the first rail by the operational member is completed.

7. The seat apparatus according to claim 6, wherein
the operational member is rotatably connected to the second rail and includes an engaging pin, the memory release member is rotatably connected to the second rail and includes a long hole to which the engaging pin is inserted, the seat apparatus includes a restricting member provided either one of the second rail and the memory release member, the memory release member rotates together with rotation of the operational member to release the restriction of the movement of the memory member relative to the memory rail until the memory release member engages with the second rail through the restricting member, and the operational member rotates, as the engaging pin moves in the long hole, relatively to the memory release member to release the restriction of the movement of the second rail relative to the first rail after a rotational movement of the memory release member is restricted.

8. A seat apparatus for a vehicle, comprising:
a first rail secured to a floor of the vehicle;
a second rail secured to a seat and relatively movable to the first rail;
a lock member for restricting a movement of the second rail relative to the first rail;
an operational member for engaging with the lock member to release a restriction of the movement of the second rail relative to the first rail exerted by the lock member;
a release member for engaging with the lock member to release the restriction of the movement of the second rail relative to the first rail exerted by the lock member independently from the operational member; and
a memory member for restricting the movement of the second rail to a position relative to the first rail before the second rail moves in a first direction when the second rail relatively moves to the first rail in the first direction and after that the second rail relatively moves to the first rail in a second direction;
wherein when the restriction of the movement of the second rail relative to the first rail is released by the release member, the memory member restricts the movement of the second rail to the position relative to the first rail before the second rail moves in the first direction when the second rail relatively moves to the first rail in the first direction and after that the second rail relatively moves to the first rail in the second direction.

9. The seat apparatus according to claim 8, wherein the release member engages with the lock member as a seat back tilts over a predetermined angle to release the restriction of the movement of the second rail relative to the first rail exerted by the lock member.

10. The seat apparatus according to claim 8, further comprising a memory release member operable with the operational member, wherein
a movement of the memory member relative to the floor of the vehicle is restricted when the movement of the second rail relative to the first rail is restricted by the lock member, when the restriction of the movement of the second rail relative to the first rail is released by the operational member, the memory release member engages with the memory member to release a restriction of the movement of the memory member relative to the floor of the vehicle and the memory member integrally moves with the second rail, and when the restriction of the movement of the second rail relative to the first rail is released by the release member, the movement of the memory member relative to the floor of the vehicle is restricted while the second rail moves in the first direction and after that the second rail moves in the second direction so that the memory member engages with the second rail as the second rail moves in the second direction and so that the position of the second rail relative to the first rail before the second rail moves in the first direction can be retrieved.

11. The seat apparatus according to claim 10, wherein
the first rail includes an accommodating space, and the memory member is placed in the accommodating space.

12. The seat apparatus according to claim 10, wherein
the memory release member stops operating while the operational member continues to operate after a release of the restriction of the movement of the memory member relative to the floor of the vehicle is completed before a release of the restriction of the movement of the second rail relative to the first rail by the operational member is completed.

13. The seat apparatus according to claim 12, wherein
the operational member is rotatably connected to the second rail and includes an engaging pin, the memory release member is rotatably connected to the second rail and includes a long hole to which the engaging pin is inserted, the seat apparatus includes a restricting member provided either one of the second rail and the memory release member, the memory release member rotates together with rotation of the operational member to release the restriction of the movement of the memory member relative to the floor of the vehicle until the memory release member engages with the second rail through the restricting member, and the operational member rotates, as the engaging pin moves in the long hole, relatively to the memory release member to release the restriction of the movement of the second rail relative to the first rail after a rotational movement of the memory release member is restricted.

* * * * *